(12) United States Patent
Balasubramanian

(10) Patent No.: US 12,525,347 B1
(45) Date of Patent: Jan. 13, 2026

(54) PATIENT MONITOR AND CALL DEVICE WITH INTEGRATED SENSORS

(71) Applicant: Cox Communications, Inc., Atlanta, GA (US)

(72) Inventor: Jaiganesh Balasubramanian, Peachtree City, GA (US)

(73) Assignee: Cox Communications, Inc., Atlanta, GA (US)

( * ) Notice: Subject to any disclaimer, the term of this patent is extended or adjusted under 35 U.S.C. 154(b) by 7 days.

(21) Appl. No.: 17/888,867

(22) Filed: Aug. 16, 2022

(51) Int. Cl.
*A61G 12/00* (2006.01)
*G08B 5/22* (2006.01)
*G16H 10/60* (2018.01)
*G16H 40/67* (2018.01)
*G16H 40/20* (2018.01)

(52) U.S. Cl.
CPC .............. G16H 40/67 (2018.01); G16H 10/60 (2018.01); *G16H 40/20* (2018.01)

(58) Field of Classification Search
CPC ......... G16H 40/67; G16H 10/60; G16H 40/20
See application file for complete search history.

(56) References Cited

U.S. PATENT DOCUMENTS

| | | | | |
|---|---|---|---|---|
| 4,973,834 A * | 11/1990 | Kim | ..................... | H03K 17/941 250/221 |
| 5,651,384 A * | 7/1997 | Rudrich | ................... | E03C 1/057 4/304 |
| 6,967,612 B1 * | 11/2005 | Gorman | .................. | G01S 13/04 342/52 |
| 7,019,652 B2 * | 3/2006 | Richardson | ............ | A62B 9/006 340/517 |
| 7,110,569 B2 * | 9/2006 | Brodsky | .......... | G08B 13/19641 348/E7.086 |
| 7,567,200 B1 * | 7/2009 | Osterweil | ............... | G01S 13/56 342/28 |
| 7,916,066 B1 * | 3/2011 | Osterweil | ............. | A61B 5/1117 382/115 |
| 8,308,640 B2 * | 11/2012 | Baldus | ................... | G16H 40/63 600/300 |
| 8,525,666 B2 * | 9/2013 | Melker | .................. | G16H 40/20 340/573.6 |
| 9,766,332 B2 | 9/2017 | Ho et al. | | |
| 9,786,294 B1 | 10/2017 | Bezos et al. | | |

(Continued)

*Primary Examiner* — Quang Pham
(74) *Attorney, Agent, or Firm* — Merchant & Gould P.C.

(57) ABSTRACT

Aspects of the present disclosure provide systems, methods, and patient monitoring devices that may be utilized to overcome technical limitations associated with conventional nurse call devices. According to an aspect, a patient monitoring device includes one or more of: a microphone, a speaker, a sensor array that includes a radar sensor for detecting one or more of a physiological condition and a movement of a patient, a wireless interface, a processor, and memory. According to an aspect, the memory stores executable instructions which, when executed, upon detection of a sound with the microphone, transmit, via the wireless interface, a signal associated with the sound to a server to process the signal with a voice recognition algorithm. The server is configured to provide a communication to notify a caregiver assigned to the patient when an output from the voice recognition algorithm is determinative of the sound requiring the caregiver to interact with the patient.

21 Claims, 9 Drawing Sheets

(56) References Cited

U.S. PATENT DOCUMENTS

| | | | |
|---|---|---|---|
| 9,892,732 B1* | 2/2018 | Tian | G10L 15/24 |
| 10,068,461 B2 | 9/2018 | Wildman et al. | |
| 10,078,951 B2* | 9/2018 | Kusens | G06V 20/52 |
| 10,091,463 B1* | 10/2018 | Kusens | G06V 40/103 |
| 10,216,905 B2* | 2/2019 | Rogers | G16H 50/30 |
| 10,236,081 B2* | 3/2019 | Ahn | G16H 40/63 |
| 10,401,490 B2 | 9/2019 | Gillian et al. | |
| 10,410,498 B2 | 9/2019 | Coke et al. | |
| 10,720,038 B1* | 7/2020 | Wen | G08B 21/0453 |
| 10,810,850 B2 | 10/2020 | Eckert et al. | |
| 11,138,858 B1* | 10/2021 | Segal | G08B 25/014 |
| 11,170,295 B1* | 11/2021 | Carmichael | G06N 3/084 |
| 11,176,940 B1* | 11/2021 | Zhong | G06F 3/167 |
| 11,257,346 B1* | 2/2022 | Meyers | G06F 3/011 |
| 11,284,238 B1* | 3/2022 | Wen | H04L 67/12 |
| 11,318,960 B1* | 5/2022 | McKnew | G06V 20/59 |
| 11,471,227 B1* | 10/2022 | Roh | G16H 40/40 |
| 11,481,837 B1* | 10/2022 | Brandt | G06F 21/45 |
| 11,875,659 B2* | 1/2024 | Shin | G08B 21/043 |
| 2005/0209881 A1* | 9/2005 | Norton | G16H 40/67 705/2 |
| 2006/0139166 A1* | 6/2006 | Choutier | G08B 21/0415 340/539.12 |
| 2006/0181424 A1* | 8/2006 | Graves | G16H 80/00 600/300 |
| 2008/0106374 A1* | 5/2008 | Sharbaugh | G16Z 99/00 705/2 |
| 2009/0315719 A1* | 12/2009 | Song | G08B 21/0446 340/669 |
| 2010/0117823 A1* | 5/2010 | Wholtjen | G01S 11/16 340/539.13 |
| 2010/0315244 A1* | 12/2010 | Tokhtuev | G08B 21/245 340/603 |
| 2011/0234598 A1* | 9/2011 | Scarola | G08B 21/245 345/440.1 |
| 2012/0313775 A1* | 12/2012 | Davis | G16H 40/20 340/539.12 |
| 2012/0323090 A1* | 12/2012 | Bechtel | A61B 5/1113 600/595 |
| 2013/0043977 A1* | 2/2013 | Velius | G10L 17/10 340/5.84 |
| 2013/0155242 A1* | 6/2013 | Hevia | G08B 13/19658 348/152 |
| 2014/0019184 A1* | 1/2014 | Herickhoff | H04W 4/029 705/7.19 |
| 2014/0222526 A1* | 8/2014 | Shakil | G16H 15/00 705/7.38 |
| 2015/0109442 A1* | 4/2015 | Derenne | H04N 7/185 348/143 |
| 2015/0116497 A1* | 4/2015 | Doval | G01S 7/412 348/157 |
| 2015/0170494 A1* | 6/2015 | Hsu | A61B 5/1117 340/539.17 |
| 2015/0294086 A1* | 10/2015 | Kare | G16H 20/70 705/2 |
| 2015/0302538 A1* | 10/2015 | Mazar | G08B 21/0211 705/2 |
| 2016/0085565 A1* | 3/2016 | Arcese | H04L 63/0861 726/7 |
| 2017/0199973 A1* | 7/2017 | Walton | G16H 15/00 |
| 2017/0281276 A1* | 10/2017 | Gilham | A61B 5/1116 |
| 2017/0299710 A1* | 10/2017 | Shin | G01S 13/86 |
| 2018/0000385 A1* | 1/2018 | Heaton | G08B 25/016 |
| 2018/0374570 A1* | 12/2018 | Nishikado | A61B 5/1115 |
| 2019/0034828 A1* | 1/2019 | Cagadas | H04L 51/02 |
| 2019/0053761 A1* | 2/2019 | Young | A61B 5/1102 |
| 2019/0133443 A1* | 5/2019 | Konno | A61B 5/0205 |
| 2019/0172579 A1* | 6/2019 | Peterson | G16H 40/67 |
| 2019/0175411 A1* | 6/2019 | Awiszus | A62B 9/006 |
| 2019/0188606 A1* | 6/2019 | Hendersen | G16H 70/00 |
| 2019/0209022 A1* | 7/2019 | Sobol | A61B 5/681 |
| 2019/0320260 A1* | 10/2019 | Alders | G10L 21/0316 |
| 2020/0075140 A1* | 3/2020 | Embree | G16H 10/60 |
| 2020/0111341 A1* | 4/2020 | Zhao | G06V 40/23 |
| 2020/0143654 A1* | 5/2020 | Howard | H04W 4/90 |
| 2020/0203007 A1* | 6/2020 | Durlach | A61G 7/002 |
| 2020/0205580 A1* | 7/2020 | Sayadi | A61B 5/7475 |
| 2020/0289033 A1* | 9/2020 | Sivertsen | A61B 5/7275 |
| 2020/0393890 A1* | 12/2020 | Hayashi | G06F 1/3231 |
| 2020/0410072 A1* | 12/2020 | Giusti | H04W 12/06 |
| 2021/0049890 A1* | 2/2021 | Han | G06N 20/00 |
| 2021/0052198 A1* | 2/2021 | Parvaneh | A61B 5/1117 |
| 2021/0064142 A1* | 3/2021 | Stern | G01S 13/42 |
| 2021/0064143 A1* | 3/2021 | Stern | G06F 3/04886 |
| 2021/0096217 A1* | 4/2021 | Jadidian | G01S 13/30 |
| 2021/0096233 A1* | 4/2021 | Jadidian | G01S 7/2806 |
| 2021/0098119 A1* | 4/2021 | Hochworter | G16H 40/67 |
| 2021/0153817 A1 | 5/2021 | Beyer et al. | |
| 2021/0196121 A1* | 7/2021 | Aarnio | A61B 5/002 |
| 2021/0225495 A1* | 7/2021 | Rusak | G16H 40/67 |
| 2021/0366257 A1* | 11/2021 | Ten Kate | G08B 21/182 |
| 2021/0375278 A1* | 12/2021 | Hatambeiki | G16H 50/20 |
| 2022/0020257 A1* | 1/2022 | Kechichian | G08B 21/0492 |
| 2022/0036716 A1* | 2/2022 | Greenwood | G06N 3/02 |
| 2022/0094720 A1 | 3/2022 | Wang et al. | |
| 2022/0115099 A1* | 4/2022 | Vollrath | G16H 10/60 |
| 2022/0139535 A1* | 5/2022 | Kushnir | G16H 50/70 705/2 |
| 2022/0189627 A1* | 6/2022 | Kim | H04W 4/38 |
| 2022/0192605 A1* | 6/2022 | Webster | G16H 40/67 |
| 2022/0199250 A1* | 6/2022 | Chandra | H04L 63/0428 |
| 2022/0246286 A1* | 8/2022 | Eddy | G16H 50/20 |
| 2022/0283279 A1* | 9/2022 | Menis | G01S 7/003 |
| 2022/0328180 A1* | 10/2022 | Chelles | G16H 40/67 |
| 2022/0375613 A1* | 11/2022 | Sinha | A61B 5/6898 |
| 2023/0026197 A1* | 1/2023 | Choi | G06F 3/048 |
| 2023/0036721 A1* | 2/2023 | Giegerich | G06F 16/168 |
| 2023/0298739 A1* | 9/2023 | Williams | G16H 50/20 705/2 |

* cited by examiner

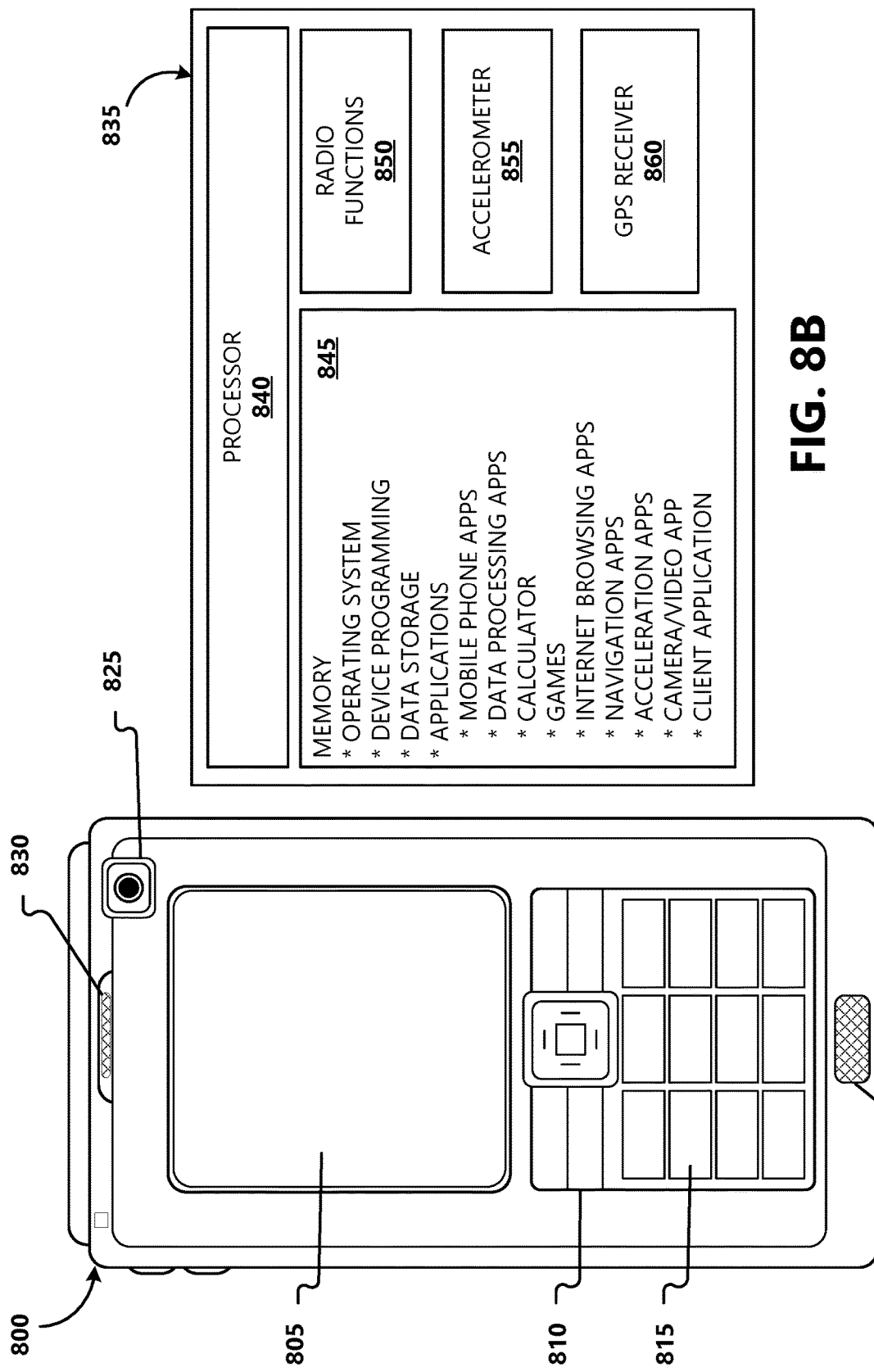

PATIENT MONITOR AND CALL DEVICE WITH INTEGRATED SENSORS

BACKGROUND

Conventionally, hospital or patient rooms include button type devices that enable a patient to press a button to call for a nurse. Button type nurse call devices are tethered to a particular patient location (e.g., patient bed or room) and physically wired to a respective nurse call station. Different variations of button type nurse call devices have been utilized, but all are limited in that they require a patient to be in close proximity in order to physically push a button to call for a nurse. For example, an extra large nurse call button, also referred to as a pancake button, may be installed in a hospital room for limited mobility patients. Handheld pillow speaker units are also utilized that include multiple buttons, each button requiring a physical touch to facilitate a certain type of patient request.

If a patient has fallen or wandered away from a wired nurse call device, the patient may not be able to reach the nurse call device to press a button in order to summon help. Accordingly, conventional button type nurse call devices are technically limited due in part by requiring both of patient proximity and a patient's touch to actuate a button to call a nurse. Conventional button type nurse call devices are further technically limited since they are constrained to serving particular nurse stations due to the wiring that connects button type nurse call devices to corresponding nurse stations. A technical solution is needed to overcome the limited capabilities and constraints of conventional nurse call devices.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure provide systems, methods, and patient monitoring devices that may be utilized to overcome technical limitations associated with conventional nurse call devices, but are not so limited. According to an aspect, a patient monitoring device includes one or more of: a microphone, a speaker, a sensor array that includes a radar sensor for detecting one or more of a physiological condition and a movement of a patient, a wireless interface, a processor, and memory. According to an aspect, the memory stores executable instructions which, when executed, upon detection of a sound with the microphone, transmit, via the wireless interface, a signal associated with the sound to a server to process the signal with a voice recognition algorithm. The server is configured to provide a communication to notify a caregiver assigned to the patient when an output from the voice recognition algorithm is determinative of the sound requiring the caregiver to interact with the patient.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 8A and 8B are block diagrams illustrating example physical components of a suitable mobile computing environment with which aspects of the present disclosure can be practiced.

DETAILED DESCRIPTION

Aspects of the present disclosure provide systems, methods, and patient monitoring devices that may be utilized to overcome technical limitations associated with conventional nurse call devices, but are not so limited. According to an aspect, a patient monitoring device includes one or more of: a microphone, a speaker, a sensor array that includes a radar sensor for detecting one or more of a physiological condition and a movement of a patient, a wireless interface, a processor, and memory. According to an aspect, the memory stores executable instructions which, when executed, upon detection of a sound with the microphone, transmit, via the wireless interface, a signal associated with the sound to a server to process the signal with a voice recognition algorithm. The server is configured to provide a communication to notify a caregiver assigned to the patient when an output from the voice recognition algorithm is determinative of the sound requiring the caregiver to interact with the patient.

Figure 1:
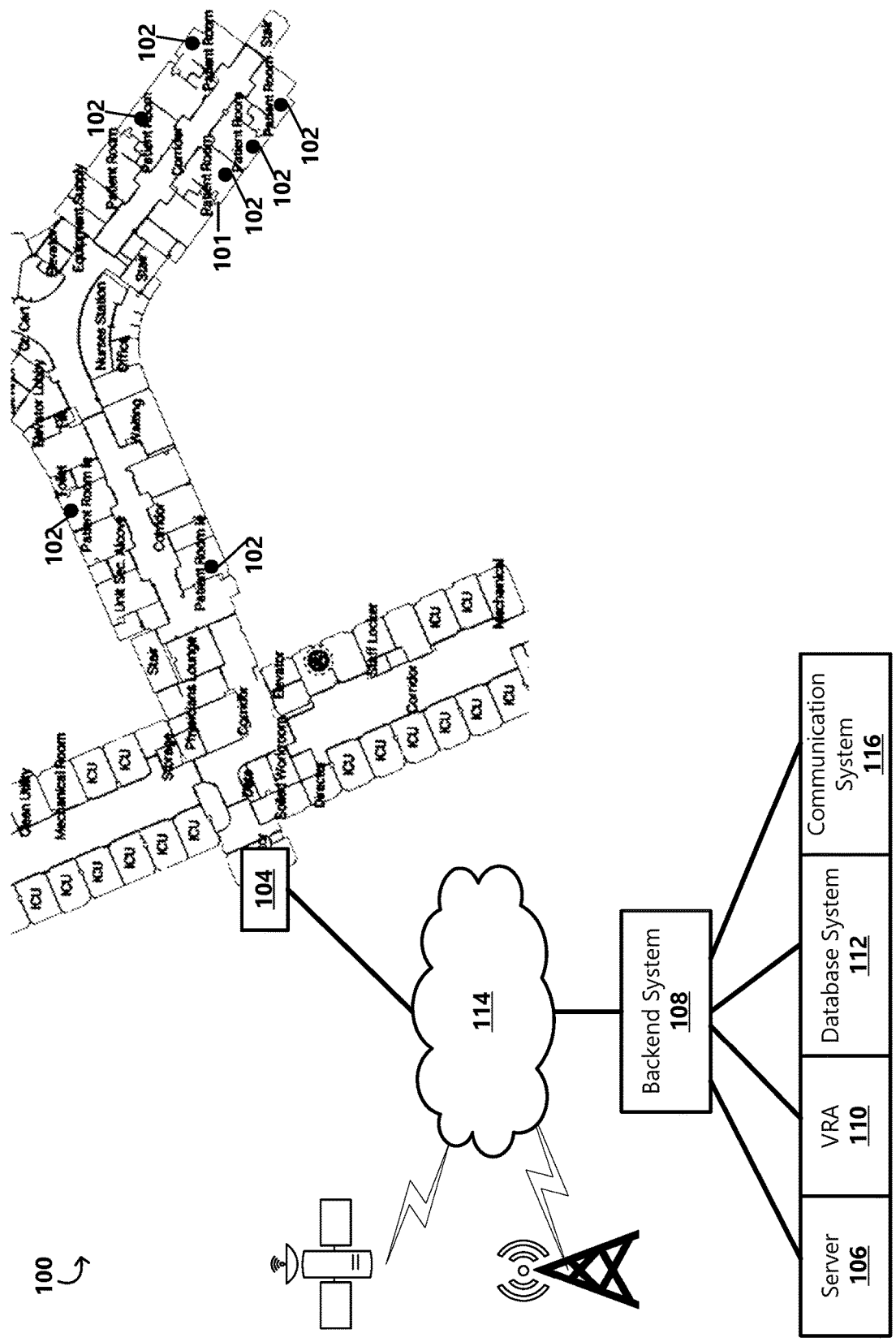
FIG. 1 is a block diagram of an example communication environment in which aspects of the present disclosure can be implemented.

FIG. 1 is a block diagram of an example communication environment 100 (environment 100) in which aspects of the present disclosure can be implemented. For example, as shown in FIG. 1, environment 100 may include a wing or floor of a hospital or other patient care facility. As described below, and according to one aspect, each patient room 101 includes a patient monitoring device (PMD) 102 in the form of a smart speaker configured to provide multiple functions as part of monitoring and/or serving a patient assigned to patient room 101. PMD 102 is configured with a variety of sensor and wireless interfaces that can be used to monitor a patient and wirelessly convey patient-related information, via modem/router 104, to at least one server 106 located in environment 100. While server 106 is shown as being included with backend system 108 (e.g., a service provider system), server 106 may be located elsewhere such as part of an edge network or within premises where multiple PMDs are located. For example, a dedicated server may be located on each floor of a hospital to interface with corresponding PMDs located in each floor or located in an equipment room that includes additional communication equipment such as routers/modems or other communication infrastructure.

As shown for the example environment 100 of FIG. 1, backend system 108 includes a voice recognition algorithm (VRA) 110 that is configured to process sound or acoustic waves, such as voice data, noises, and other sounds detected or received by PMD 102 within patient room 101. For example, a signal or message with voice data may be sent, via modem/router/gateway/access point 104, from PMD 102 over network 114 (e.g., a cloud network, private/public network, etc.) to backend system 108 for processing by VRA 110. VRA 110 may incorporate different types of models to process sound detected by PMD 102, such as predictive coefficient models, feature-based models, phonetic models, hidden Markov models, linear regression models, dynamic time warp models, artificial neural networks, vector quantization models, etc. Machine learning techniques can be used to perfect VRA 110 as PMDs are added to and/or reassigned within environment 100.

While VRA 110 is shown to be included with backend system 108, all or a portion of VRA 110 can be included in each PMD 102 to process sound locally at each device. Once sound information is processed by VRA 110, one or more actions may be taken. For example, if an output of VRA 110 determines that a sound is a call for a nurse, backend system 108 or PMD 102 can utilize database system or database 112 or locally stored data to identify a nurse or other caregiver assigned to the patient or patient room 101 and use communication system 116 or PMD 102 to contact the assigned nurse or caregiver. For example, PMD 102 can be configured to use a wireless interface (e.g., BLUETOOTH, Institute of Electrical and Electronics Engineers (IEEE) 802.11, ultrawide band, etc.) to contact or notify a communication device (e.g., smartphone, pager, tablet, etc.) of an assigned nurse or caregiver according to stored contact data for the assigned nurse or caregiver. According to an aspect, an application programming interface (API) can be used to provide interactive and communicative functionality between each PMD 102 and communication system 116.

According to an aspect, communication system 116 and/or PMD 102 can be configured to communicate: a message to a wireless communication device carried by an assigned nurse or caregiver, a message to a status display board located in a caregiver work area; a message to a nurse station or other caregiver computer; a signal to illuminate an indicator light located near a patient room when VRA 110 or one or more sensor outputs determine that a patient is in need of assistance. As an example, a text message, an alert or alarm, a call, etc. may be communicated to a mobile device (e.g., smartphone, tablet, pager, etc.), a nurse station computer, etc. of an assigned nurse or caregiver to inform the assigned nurse or caregiver that the patient requires assistance. In some aspects, the message can include text derived and output by VRA 110, such as a type of request uttered by a patient, notification of a fall, etc.

VRA 110 can be configured to detect and process different types of sounds such as noise associated with falls, ambulatory movements, irregular or normal breathing patters, heartbeat patterns, vocal patterns, etc. In contrast to convention button based nurse call devices, PMD 102 is configured to detect when a patient requires assistance without the patient having to physically actuate a button. As described below, PMD 102 is configured to not only request assistance by detecting sound patterns and utterances associated with a patient, but also can utilize one or more additional onboard sensors to determine when a patient does or does not require assistance.

With continuing reference to FIG. 1, VRA 110, database system 112, and/or communication system 116 can be included as part of server 106 or with one or more dedicated server machines. Data stored in database system 112 can be referred to when output from PMD 102 correlates to a patient needing assistance. For example, output communicated via a wireless interface of PMD 102 can be analyzed by VRA 110 to determine that a patient has uttered a request for a nurse or that a sound in a patient room correlates to a fall signature for the patient. As another example, one or more additional onboard sensors, such as a radar sensor or camera, can be used to detect a fall condition of a patient which requires assistance from an assigned nurse or caregiver.

According to an aspect, data stored in database system 112 can be used to identify an assigned nurse or caregiver for a patient or patient room 101 when it is determined that the patient requires some type of assistance or attention. For example, an assigned nurse for a patient can be alerted via a wireless device when PMD 102 detects that an emergency situation exists for the patient. Once the assigned nurse or caregiver visits the patient or patient room 101, visitation data (e.g., date/time, room number, name of nurse or caregiver and patient, prognosis, patient physiological data, action, etc.) can be stored in database system 112 and reviewed to verify that the patient received care.

In one aspect, backend system 108 can include a real-time locating system (RTLS) for locating equipment and personnel in part by querying database system 112. RTLS includes RTLS receiver devices located throughout a healthcare or other facility, RTLS badges or tags worn by caregivers, and/or tags attached to or embedded with equipment. As caregivers and equipment move about a facility equipped with RTLS devices, tags are configured to transmit signals to RTLS receivers at each location. Tags can include a unique tag identifier that can be correlated in database system 112 to identify a caregiver or equipment to which a tag has been assigned. Each receiver can be configured to transmit a unique identifier with a detected tag identifier to database system 112 to determine a particular location, such as a patient room, equipment room, hallway, etc. Server 106 can refer to database system 112, based on transmissions from RTLS devices of associated identifiers to determine locations of assigned nurses or caregivers. PMD 102 can also be equipped with a radio frequency identifying device or interface to enable real time location service RTLS asset tracking, staff tracking, and patient tracking Database system 112 can be configured to store: various data that includes, but is not limited to: radio frequency (RF) tag identifiers for tags attached to equipment; badge identifiers with RF identifiers or RF identification (RFID) worn by caregivers; wireless receiver identifiers and their locations in patient rooms, hallways, etc.; PMD identifiers and room locations; contact information of assigned nurses or caregivers, patients, patient contacts, etc. As one implementation example, after PMD 102 detects an utterance by a patient, PMD 102 transmits sound data to backend system 108 with an identifier that identifies PMD 102 and/or room location or number.

Database system 112 can then be used to identify the assigned nurse or caregiver assigned to the patient or patient room 101 according to the PMD identifier (e.g., unique identifier, media access control (MAC) address, etc.). Database system 112 may be updated as nurses change shifts, are reassigned to a different patient, as new patients are admitted, when equipment is relocated or reallocated, etc. As depicted in FIG. 1, communications between a facility, such as a hospital or other patient care center, may be sent to and from backend system 108 via a hybrid fiber coaxial (HFC) network, fiber network, satellite network, cellular network, or other communication network.

As one non-limiting example, a cable modem termination system (CMTS) located at a headend location may provide services, including internet and cloud services, to a facility over a hybrid fiber-coaxial (HFC) network. A data over cable service interface specification (DOCSIS) standard may be utilized for exchanging data. As another non-limiting example, an optical line terminal (OLT) located at a headend location may provide the services, including broadband internet access, to a facility over a passive optical network (PON). A PON standard may be utilized for exchanging data with the OLT.

Figure 2:
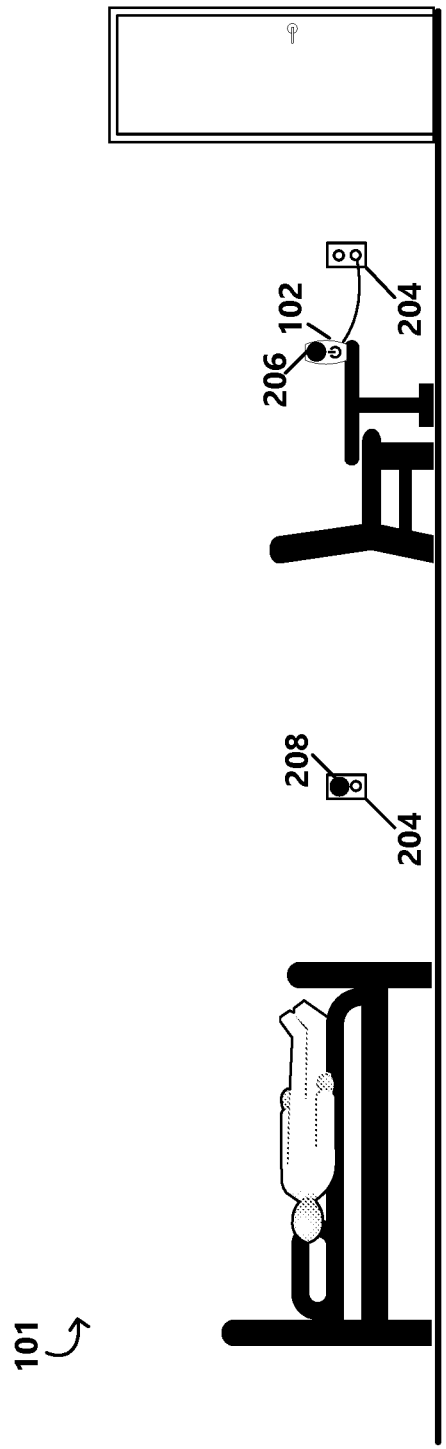
FIG. 2 is a block diagram of a patient room equipped with a patient monitoring device (PMD) to monitor and receive communications from a patient according to an aspect.

FIG. 2 is a block diagram of a patient room 101 equipped with a PMD 102 to monitor and receive communications from a patient 202 according to an aspect. For multi-patient rooms, a single PMD 102 or multiple PMDs may be provisioned. As described further below, PMD 102 may be equipped with one or more microphones to detect noises or sounds associated with patient 202, such as utterances, movements, physiological conditions, etc. For this example, PMD 102 is located on a table and connected to an A/C wall outlet 204 and can be always "on" to continuously monitor and/or receive commands from patient 202.

PMD 102 can be equipped with one or more rechargeable batteries as a backup or primary power source when required. PMD 102 can include an RFID tag 206 for tracking PMD 102. However, RFID tag 206 can be omitted in some implementations since PMD 102 includes its own unique identifier which can be transmitted via one or more wireless interfaces along with any information or data associated with detections by PMD 102. For this example, patient room 101 includes a low-energy BLUETOOTH to WIFI gateway 208 as part of an RTLS infrastructure (e.g., Bluetooth Low Energy (BLE) 4.2/WIFI: 802.11 b/g/n; 2400-2483.5 MHZ (40 channels); Maximum Output Power Bluetooth Low Energy (BLE): <10 dBm/WIFI: <20 dBm; Modulation Bluetooth Low Energy (BLE): Gaussian frequency shift keying (GFSK); WIFI: 802.11 B: DSSS, 802.11 G/N: orthogonal frequency-division multiplexing (OFDM); Antenna/Gain, 0 dBi; Mode of Operation half-duplex; Data Rates 1 Mbit/s).

In addition to other detection capabilities, gateway 208 is configured to detect RFID tags attached to equipment, nurses, caregivers, etc. and use its WIFI interface to transmit detected tag information to backend system 108 or some other component. For example, when a nurse enters the room 101, gateway 208 detects an RFID tag worn by the nurse and transmits the detection information (e.g., ID number) to backend system 108 for use in identifying the nurse as well as the room number and time of visit.

As described below in conjunction with FIG. 3, PMD 102 includes at least one wireless interface, such as a BLUETOOTH interface, a WIFI interface, an ultrawide band interface, etc. enabling PMD 102 to communicate detection data and other data (e.g., voice data) to backend system 108 or some other system or component. Once plugged into outlet 204 or powered by battery, PMD 102 can be configured to continuously monitor room 101 using one or more sensors including one or more of a microphone, a radar sensor, a camera, an infrared sensor, etc. As PMD 102 detects patient and/or room conditions with one or more of the onboard sensors, detection data can be transmitted to backend system 108 or some other component or system and/or one or more actions can be taken according to a type of detected data, as described further below.

Figure 3:
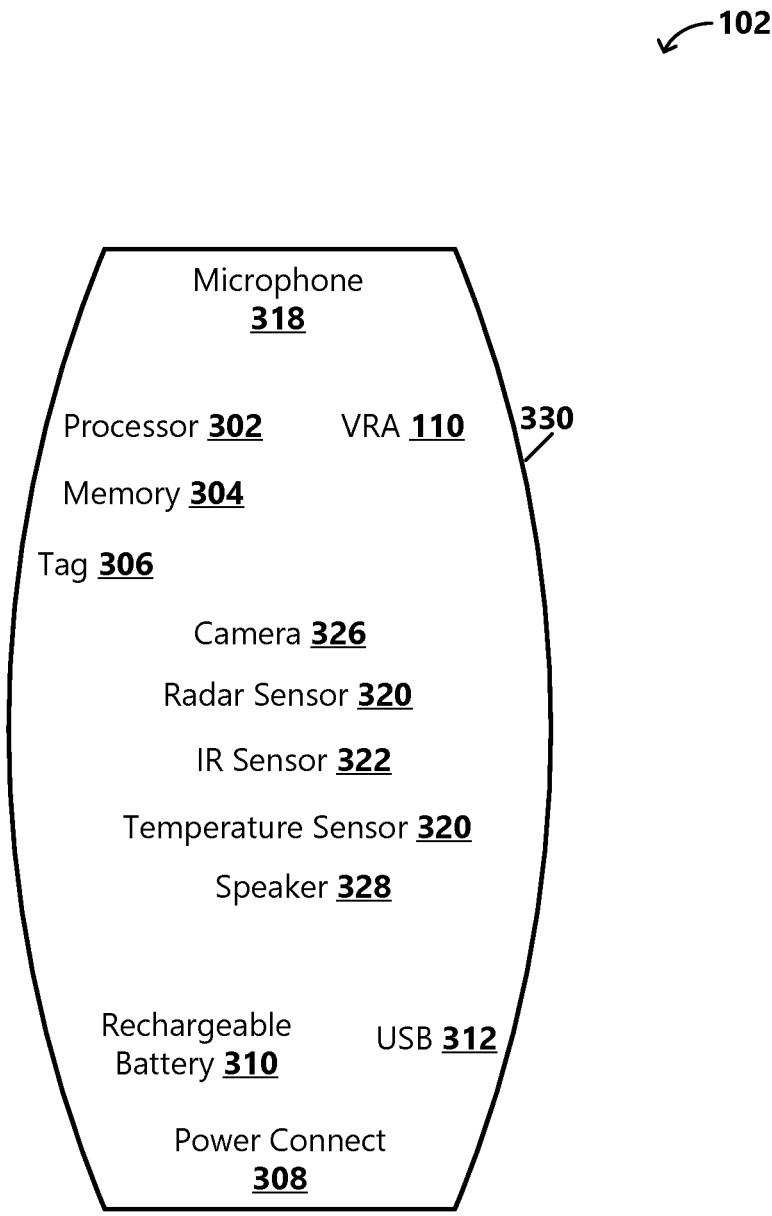
FIG. 3 is a block diagram illustrating components of a PMD according to an aspect.

FIG. 3 is a diagram illustrating components of PMD 102 comprising a smart speaker according to an aspect. As shown in FIG. 3, PMD 102 includes at least one processor 302, memory 304, an optional RFID tag 306, A/C power connection 308, optional rechargeable battery 310, USB port 312, power button 314, wireless interface(s) 316, and one or more sensors that include a microphone 318, a radar sensor 320, an infrared (IR) sensor 322 to detect if an individual is near the smart speaker, a temperature sensor 324 to detect temperature relative to a position of the smart speaker, and a camera 326 to capture images or video relative to a position of the smart speaker. While not shown, PMD 102 can include additional sensors or components, such as a proximity sensor to detect if an individual is near the smart speaker, an ambient light sensor to detect light quality relative to a position of the smart speaker, and/or RTLS components. Processor 302, memory 304, and/or one or more of the sensors can be manufactured as part of a silicon on a chip (SOC) device. While certain sensors are included, it will be appreciated that PMD 102 can include greater or fewer numbers of sensor types.

According to one exemplary implementation, PMD 102 is configured as a smart speaker device for monitoring patient 202 that includes a speaker 328 for emitting sounds. The housing 330 can be configured in different shapes, sizes, and with different types of materials according to preferred implementations. As described above, once plugged in to a wall outlet or via one or more batteries, PMD 102 can be powered on automatically or via power button 314. If a building were to lose power, battery 310 continues to provide power to PMD 102. In some aspects, components that require more power or longer sensing durations, for example, radar sensor 320, can be powered up according to certain trigger events. For example, if IR sensor 322 detects movement by patient, the detected movement can be used to activate a fall detection algorithm with radar sensor 320 to detect whether the patient 202 has fallen and/or physiological conditions of the patient (e.g., breathing patterns, heart-rate patterns, etc.). Temperature sensor 324 can be used to detect a temperature of room 101 and/or patient 202 as part of gathering additional physiological data.

IR sensor 322 can be used to detect movement of patient 202 by transmitting and receiving infrared energy. According to an aspect, radar sensor 320 and/or camera 326 can be activated after IR sensor 322 detects movement to validate output of IR sensor 322 and/or gather data concerning a particular patient or caregiver. Radar sensor 320 can be configured with at least one antenna, a transceiver, a power amplifier, a frequency filter, a low noise amplifier, and/or other components including different antennas and/or antenna patterns according to a preferred implementation. Radar sensor 320 is configured to transmit RF energy into patient room 101 and receive RF energy from reflecting objects including patient 202.

Microphone 318 or microphone sensor of PMD 102 is configured to detect sounds within or about room 101. For example, microphone 318 can be used to detect utterances from patient 202, movement of patient 202, falls of patient 202, utterances by an assigned nurse or caregiver, etc. Depending on the different types of sounds detected by microphone 318, PMD 102 can be configured to perform one or more actions. In some cases, action types can be stored in database system 112 for correlating with output of VRA 110 to determine which type of action to perform. As one example, PMD 102 can sound an alert using speaker 328 to notify caregivers within proximity to room 101 that patient 202 requires assistance. As another example, PMD 102 can execute instructions stored in memory 304 with processor 302 to send a message or signal via wireless interface(s) 316 to backend system 108 and/or devices as part of sending a communication to a nurse or caregiver assigned to a particular patient when an associated PMD detects a situation requiring assistance, as described below.

Figure 4A:
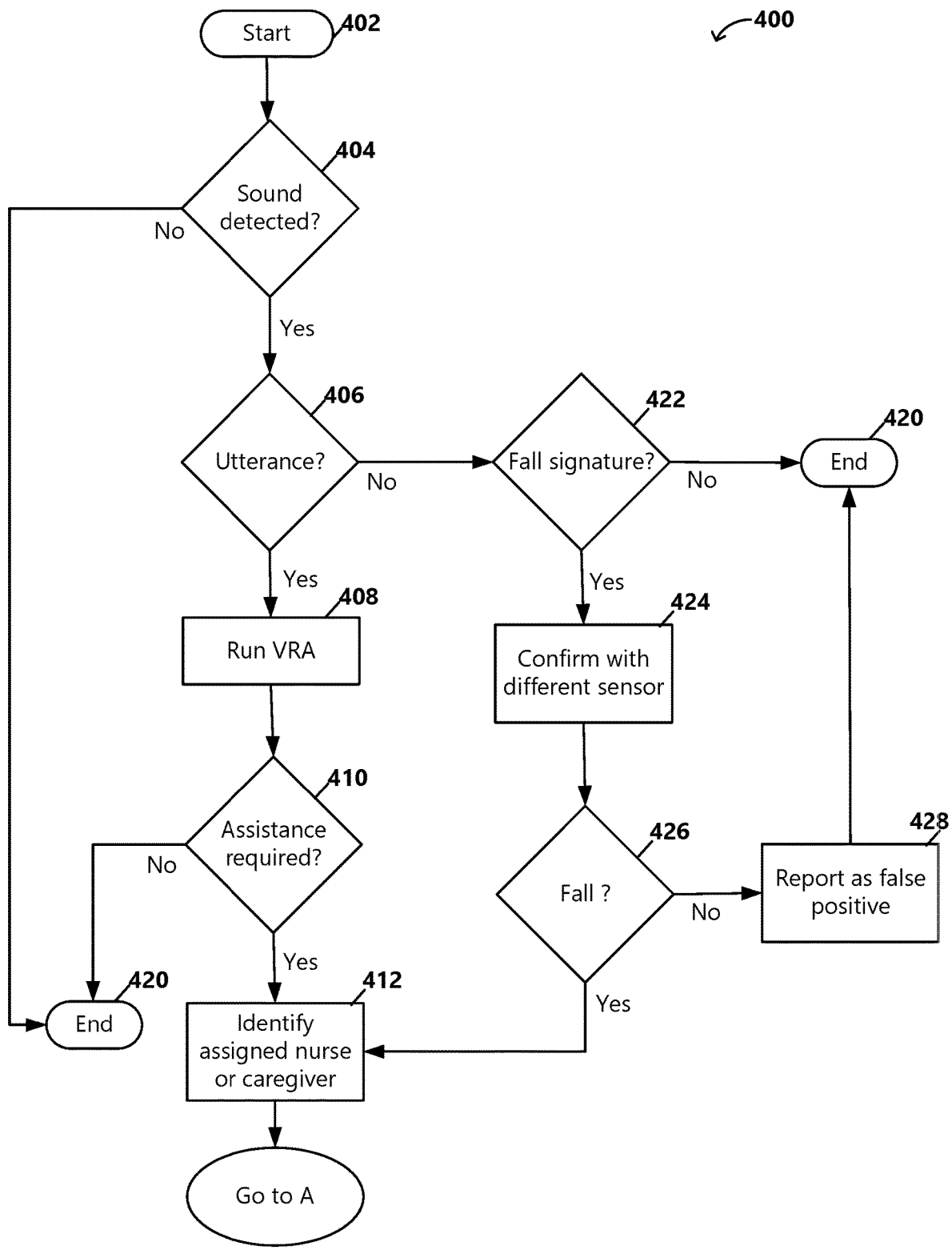
FIGS. 4A and 4B depict a flow diagram of an exemplary method of using a PMD to monitor a patient according to an aspect.
Figure 4B:
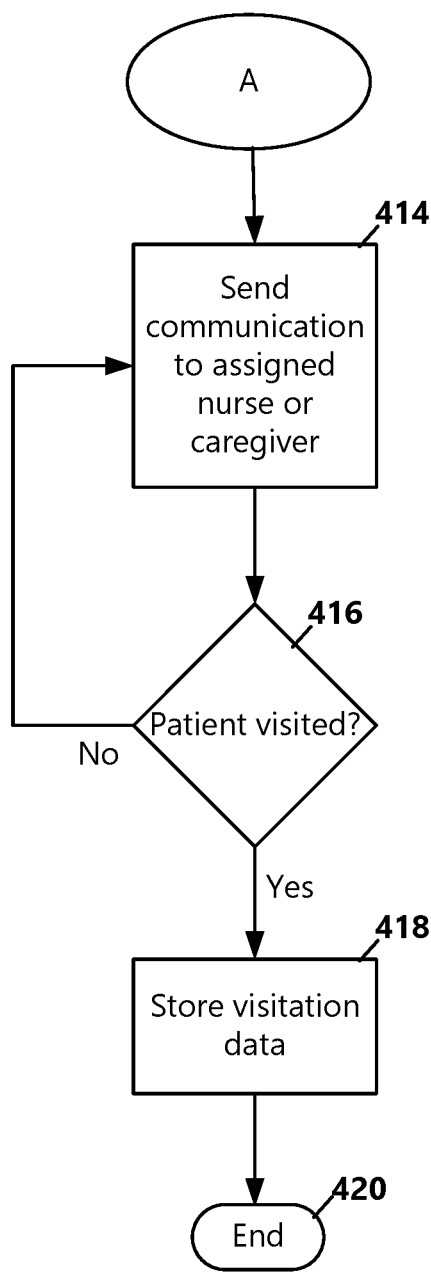

FIGS. 4A and 4B depict a flow diagram of an exemplary method 400 of using PMD 102 to monitor patient 202 according to an aspect. Method 400 begins at 402 and proceeds to 404 where method 400 determines if a sound has been detected by PMD 102. If no sound has been detected by PMD 102 at 404, method 400 exits at 420. If a sound has been detected by PMD 102 at 404, at 406 method 400 determines if the sound is an utterance by patient 202. In one aspect, at 406 method 400 uses VRA 110 to determine whether the sound is an utterance or some other type of sound. If method 400 determines at 406 that the sound is an utterance, at 408 method 400 uses VRA 110 to process the sound to determine a type of request uttered by patient 202.

At 410, based on the output from VRA 110 after processing the utterance, method 400 determines whether the patient 202 requires assistance by an assigned nurse or caregiver. If no assistance is needed at 410, method 400 exits at 420. If assistance is needed at 410, at 412 method 400 queries database system 112 to identify the assigned nurse or caregiver for patient 202. For example, a query can be sent to database system 112 using identifier associated with PMD 102 to identify the assigned nurse or caregiver of patient 202 and/or contact information of the assigned nurse or caregiver. As shown in FIG. 4B, at 414 method 400 sends a communication to a device of the assigned nurse or caregiver using contact or device information stored in database system 112 or PMD 102. For example, PMD 102 or communication system 116 can be used to send a message to a device of the assigned nurse or caregiver that informs the assigned nurse or caregiver of the need for patient assistance along with any relevant physiological information collected by PMD 102.

At 416, method 400 determines if the assigned nurse or caregiver visited patient 202. For example, PMD 102, gateway 208, or some other device can be used at 416 to detect an RF tag or badge worn by the assigned nurse or caregiver as they enter patient room 101 and assist patient 202. In one aspect, radar sensor 320 can be triggered to power on and detect whether the assigned nurse or caregiver has interacted with patient 202. If the assigned nurse or caregiver has not assisted patient 202 at 416, method 400 returns to 414 and sends another communication to the assigned nurse or caregiver. Method 400 may also query database system 112 for another contact if the assigned nurse or caregiver does not respond to the alert. If the assigned nurse or caregiver has assisted patient 202 at 416, at 418 method 400 stores visitation data in database system 112 before exiting at 420. For example, the visitation data can include a time of visit, identity of the assigned nurse or caregiver, reason for the visit, patient condition, physiological data, PMD 102 identifier, etc.

With continuing reference to FIG. 4A, if method 400 determines at 406 that the sound is not an utterance, at 422 method 400 determines if the sound corresponds with a fall signature. For example, VRA 110 can be tuned to determine whether certain sounds correlate with falling events or fall signatures. Machine learning can be used in conjunction with sounds associated with falls to generate fall signatures. If the sound does not correlate with a fall signature at 422, method exits at 420. If the sound does correlate with a fall signature at 422, method proceeds to 424 and uses a different sensor type (e.g., radar sensor 320) to verify that the fall signature does in fact correlate to a fall. For example, radar sensor 320 can be activated when a sound correlates with a fall signature to transmit radio wavs toward patient 202 to determine whether patient 202 is on or near a floor surface to thereby confirm that a fall has occurred. If method 400 confirms that the patient 202 has fallen at 426, method 400 proceeds to 412 and continues as described above.

According to an aspect, at each of steps 410 and 426, method 400 can use one or more sensors to collect physiological data (e.g., breathing patterns, heartrate patterns, skin temperature, etc.) of patient 202 which may be communicated to the assigned nurse or caregiver at 414. In one aspect, once a fall is confirmed, camera 326 is activated and images are sent to a device of the assigned nurse or caregiver. Camera 326 can also be used, in addition to or exclusive of the radar sensor 320, to confirm falling events. If method 400 determines that the patient 202 has not fallen at 426, method 400 proceeds to 428 and reports a false positive associated with a fall signature for storage in database system 112. Accordingly, method 400 is able to hone and perfect fall detection determinations according to sensor output of PMD 102 for different patients and settings.

Figure 5:
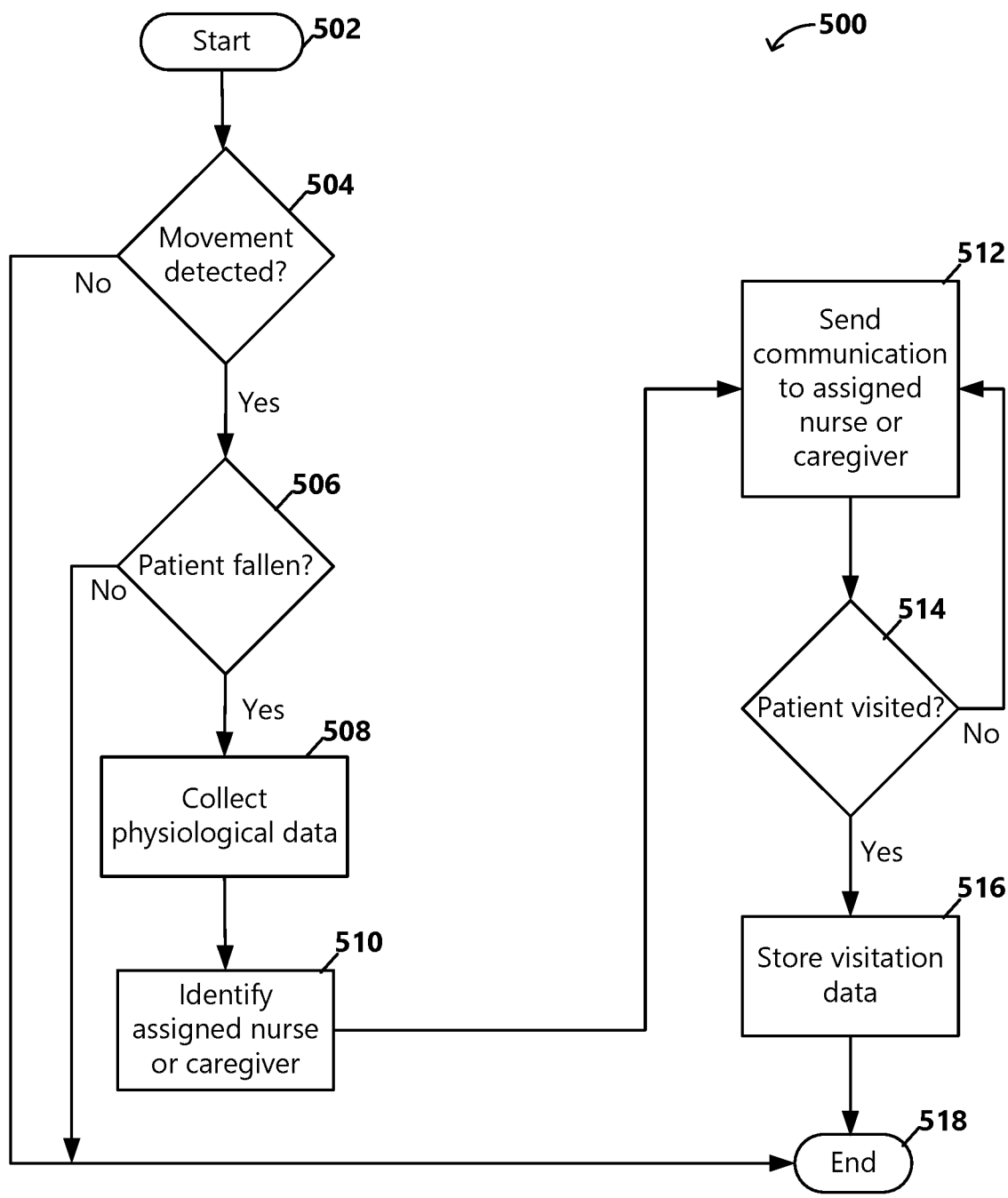
FIG. 5 is a flow diagram of an exemplary method of using a PMD to monitor a patient according to an aspect.

FIG. 5 is a flow diagram depicting an exemplary method 500 of using PMD 102 to monitor patient 202 according to an aspect. Method 500 begins at 502 and proceeds to 504 where method 500 determines if a movement by patient 202 has been detected. For example, microphone 318 can be used to detect sounds indicative of patient movement, IR sensor 322 can be used to detect patient movement, radar sensor 320, and/or camera 326 can be used to detect patient movement. If movement has not been detected at 504, method 500 exits at 518. If movement has been detected at 504, at 506 method 500 determines if the movement correlates with a fall signature that indicates patient 202 has fallen.

If method 500 determines that the patient 202 has fallen at 506, at 508 method 500 uses one or more of its sensors to collect physiological data (e.g., breathing patterns, heartrate patterns, skin temperature, etc.) of patient 202 which may be communicated to the assigned nurse or caregiver at 512. As described above in reference to FIGS. 4A and 4B, camera 326 and/or radar sensor 320 can be activated to confirm falling events. If method 500 determines that the patient 202 has not fallen at 506, method 500 exits at 518.

After determining a falling event, at 510 method 500 queries database system 112 to identify the assigned nurse or caregiver for patient 202. For example, a query can be sent to database system 112 using an identifier associated with PMD 102 to identify the assigned nurse or caregiver. At 512 method 500 sends a communication to a device of the assigned nurse or caregiver using contact or device information stored in database system 112. For example, PMD 102 or communication system 116 can be used to send a message to a device of the assigned nurse or caregiver.

At 514 method 500 determines if the assigned nurse or caregiver visited patient 202. For example, PMD 102, gateway 208, or some other device can be used at 514 to detect an RF tag or badge worn by the assigned nurse or caregiver as they enter patient room 101 and assist patient 202. In one aspect, radar sensor 320 can be triggered to transmit and detect whether the assigned nurse or caregiver has interacted with patient 202. If the assigned nurse or caregiver has not assisted patient 202 at 514, method 500 returns to 512 and sends another communication to the assigned nurse or caregiver. Method 500 may also query database system 112 for another contact if the assigned nurse or caregiver did not respond to the alert. If the assigned nurse or caregiver has assisted patient 202 at 514, at 516 method 500 stores visitation data in database system 112 before exiting at 518. For example, the visitation data can include a time of visit, identity of the assigned nurse or caregiver, reason for the visit, patient condition, physiological data, PMD 102 identifier, etc.

Figure 6:
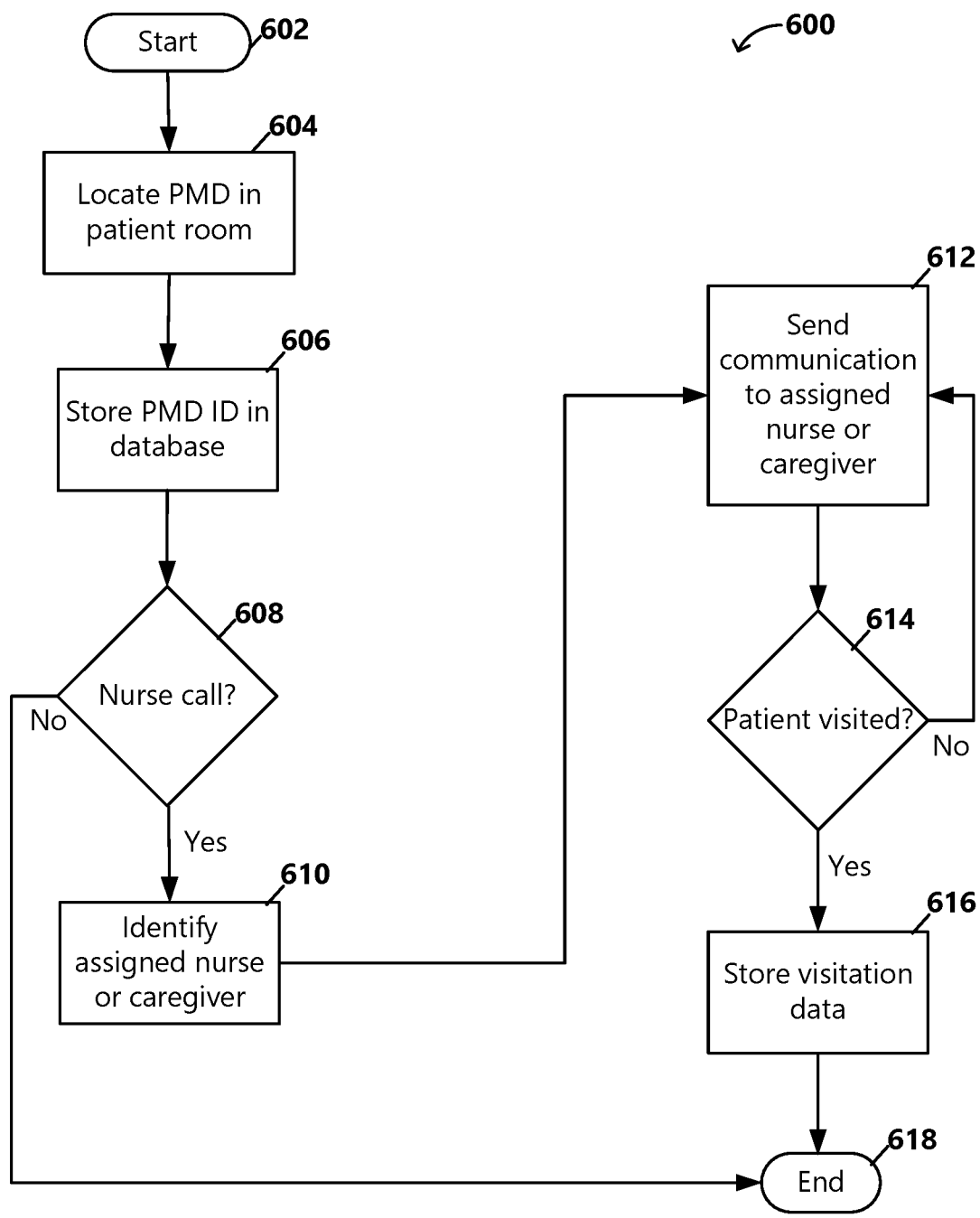
FIG. 6 is a flow diagram of an exemplary method of using a PMD to call an assigned nurse or caregiver according to an aspect.

FIG. 6 is a flow diagram depicting an exemplary method 600 of using PMD 102 to call or contact an assigned nurse or caregiver according to an aspect. Method 600 begins at 602 and proceeds to 604 where PMD 102 is located or installed in patient room 101, plugged in, and powered on. For example, PMD 102 may be located in patient room 101 so that one or more onboard sensors are directed at or towards the patient's bed. At 606, method 600 stores an identifier of PMD 102 in database system 112 along with one or more of a patient name, patient room number, name and contact information assigned nurse or caregiver.

At 608 method 600 determines if the patient 202 has called for a nurse. For example, microphone 318 of PMD 102 can be used to detect utterances by patient and VRA 110 can be used to determine what the patient uttered. If method 600 determines that patient 202 has requested a nurse at 608, method proceeds to 610 and queries database system 112 to identify the assigned nurse or caregiver for patient 202. For example, a query can be sent to database system 112 using a PMD ID of PMD 102 to identify the assigned nurse or caregiver.

At 612 method 600 sends a communication to a device of the assigned nurse or caregiver using contact or device information stored in database system 112. For example, PMD 102 or communication system 116 can be used to send the utterance associated with the nurse call as a voicemail or text message to a device of the assigned nurse or caregiver. According to one aspect, method 600 can establish a two-way communication channel between a wireless interface of PMD 102 and a device of the assigned nurse or caregiver to enable direct communication between patient 202 and the assigned nurse or caregiver. Method 600 can use one or more sensors to collect physiological data (e.g., breathing patterns, heartrate patterns, skin temperature, etc.) of patient 202 which may be communicated to the assigned nurse or caregiver at 612.

At 614 method 600 determines if the assigned nurse or caregiver visited patient 202. For example, PMD 102, gateway 208, or some other device can be used at 614 to detect an RF tag or badge worn by the assigned nurse or caregiver as they enter patient room 101 and/or assist patient 202. In one aspect, radar sensor 320 can be triggered to transmit and detect whether the assigned nurse or caregiver has interacted with patient 202. If the assigned nurse or caregiver has not assisted patient 202 at 614, method 600 returns to 612 and sends another communication to the assigned nurse or caregiver. Method 600 may also query database system 112 for another contact if the assigned nurse or caregiver did not respond to the alert. If the assigned nurse or caregiver has assisted patient 202 at 614, at 616 method 600 stores visitation data in database system 112 before exiting at 618. For example, the visitation data can include a time of visit, identity of the assigned nurse or caregiver, reason for the visit, patient condition, physiological data, PMD 102 identifier, etc.

Figure 7:
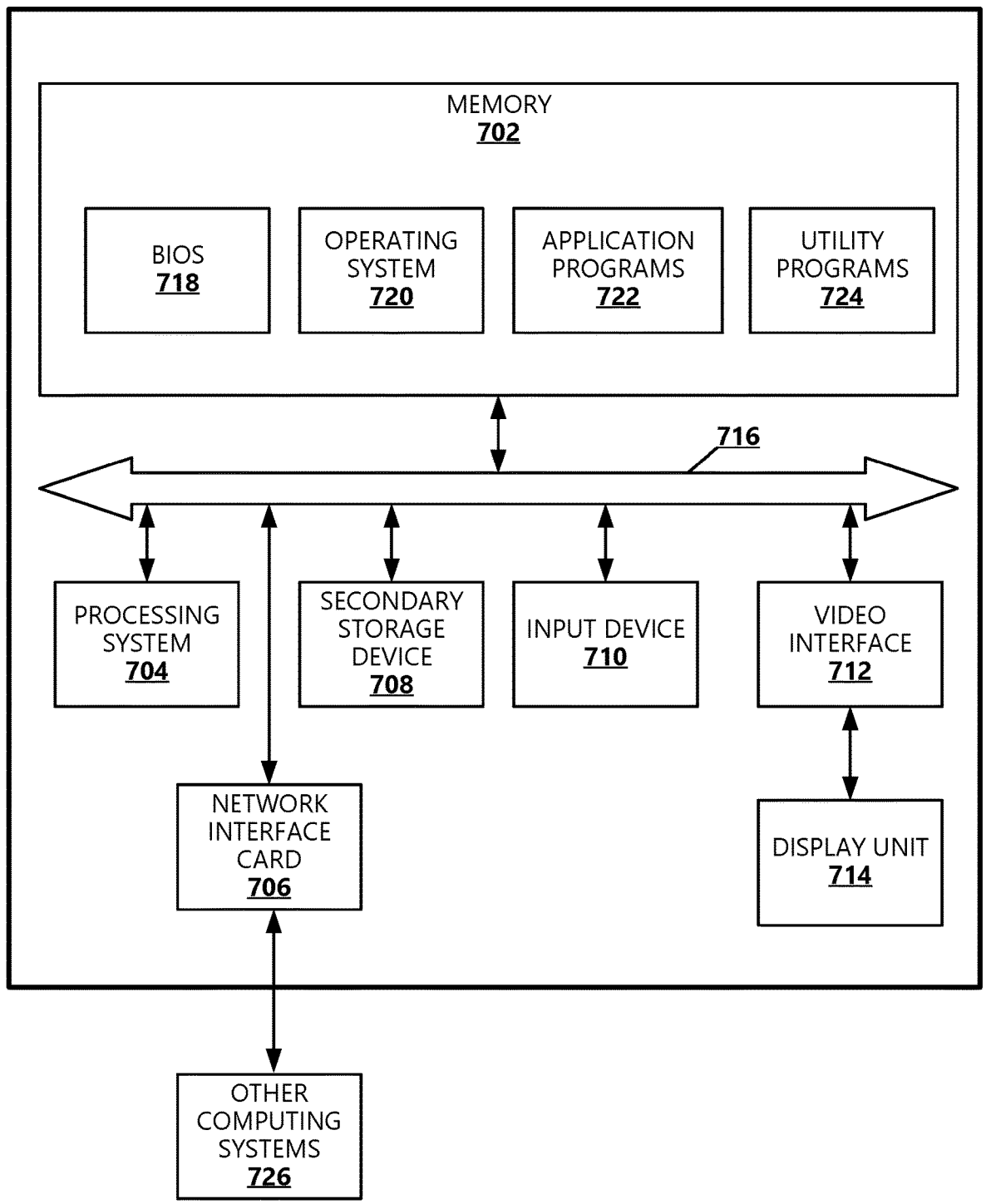
FIG. 7 is a block diagram illustrating example physical components of a computing device or system with which embodiments can be practiced.

FIG. 7 is a block diagram illustrating example physical components of a computing device 700 or system with which embodiments may be practiced as part of monitoring a patient with PMD 102. For example, computing device 700 can be representative of server 106 or another computer system. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless, cellular type, 802.11 type, etc.), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704, provide an application that is configured to utilize PMD 102 as a patient monitor. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., BLUETOOTH, cellular, WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications to users including patient monitoring and communication system. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPOE), etc. including any combination thereof.

FIGS. 8A-8B illustrate a suitable mobile computing device 800 or environment, for example, a mobile computing device or smartphone, a tablet personal computer, a laptop computer, or other device, with which aspects can be practiced. For example, mobile computing device 800 may be representative of a device used by the assigned nurse or caregiver to receive communications from PMD 102 or communication system 116. The mobile computing device 800 is illustrative of any suitable device operative to send, receive and process wireless communications, as well as run applications. A display screen 805 is operative for displaying a variety of information such as information about incoming and outgoing communications, as well as, a variety of data and displayable objects, for example, text, alphanumeric data, photographs, and the like.

Data input to the mobile computing device 800 can be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device 800, or any other suitable input means. Data can be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 can be utilized for storing a device operating system, device programming, one or more stored applications, for example, mobile telephone applications, data processing applications, operational collected and feedback applications, channel selection applications, calculators, games, Internet browsing applications, navigation applications, acceleration applications, camera and/or video applications, client applications etc.

Mobile computing device 800 can contain an accelerometer 855 for detecting acceleration, and can be used to sense orientation, vibration, and/or shock. Mobile computing device 800 can contain a global positioning system (GPS) system (e.g., GPS send/receive functionality) 860. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antenna, for allowing the mobile computing device 800 to communicate with other communication devices and systems via one or more wireless networks (e.g., cellular, WIFI, BLUETOOTH, etc.). Radio functions 850 can be utilized to communicate with a wireless or WIFI-based positioning system to determine a device location.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A system comprising:
   a server comprising:
      a voice recognition algorithm; and
      a database that stores at least caregiver information and patient monitoring device information; and
   a patient monitoring device associated with a particular patient or a patient room, wherein the patient monitoring device comprises:
      a microphone configured to detect sound data associated with the particular patient;
      a radar sensor for detecting a movement of the particular patient;
   wherein the patient monitoring device, upon detection of the sound data with the microphone, is configured to:
      send the sound data with the patient monitoring device information that identifies the patient monitoring device and/or the patient room to the server, receive, from the server, a determination of whether the sound data is an utterance and corresponds to a fall signature,
      trigger, in response to determining that the sound data corresponds to the fall signature, the radar sensor to power on and verify that the fall signature does correlate to a fall of the particular patient,
      capture, in response to verifying that the fall signature does correlate to the fall of the particular patient, one or more physiological data of the particular patient,
      querying the database to identify a caregiver assigned to the particular patient or the patient room based on the patient monitoring device information, and
      notify the caregiver assigned to the particular patient via a device of the caregiver based on the caregiver information in response to determining that the fall signature correlates to the fall,
      send the one or more physiological data to the device of the caregiver,
      detect that a badge associated with the caregiver assigned to the particular patient is in proximity to the particular patient, and
      trigger, in response to detecting the badge being proximate to the particular patient, the radar sensor to power on and detect whether the caregiver assigned to the particular patient has interacted with the particular patient after being notified.

2. The system of claim 1, wherein the radar sensor transmits radio frequency (RF) waves to detect the movement or a physiological condition of the particular patient.

3. The system of claim 1, wherein the server is configured to transmit a communication to the device of the caregiver assigned to the particular patient or another individual to alert that there is a fall condition of the particular patient.

4. The system of claim 1, wherein the badge associated with the caregiver that includes a radio frequency (RF) tag, wherein the patient monitoring device is configured to detect when the badge is in proximity to the particular patient and generate a signal associated with a visitation parameter for storage in the database acknowledging that the caregiver visited the particular patient.

5. The system of claim 1, wherein the badge associated with the caregiver that includes a radio frequency (RF) tag, wherein an accessory device installed in the patient room or the patient monitoring device is configured to detect when the badge is in proximity to the particular patient and generate a signal associated with a visitation parameter for storage in the database acknowledging that the caregiver visited the particular patient.

6. The system of claim 1, wherein the patient monitoring device is configured to determine that the caregiver visited the particular patient further based on a detected utterance of the caregiver and generate a signal associated with a visitation parameter for storage in the database acknowledging that the caregiver visited the particular patient.

7. The system of claim 1, wherein the voice recognition algorithm is configured to process the sound to determine at least one of:
   whether an emergency exists with respect to the particular patient;
   a type of request uttered by the particular patient;
   whether the sound is associated with a patient movement; and
   when the sound is not an utterance.

8. The system of claim 1, wherein the server is configured to provide a communication to at least one of:
- a wireless communication device of the caregiver;
- a display screen of a computer device located at a nurse station;
- a patient status display; and
- a patient monitoring device to trigger an audible alert over a speaker.

9. The system of claim 1, wherein the patient monitoring device comprising a smart speaker further comprises at least one of:
- an infrared (IR) sensor;
- a temperature sensor; or
- a digital camera.

10. The system of claim 1, wherein the patient monitoring device, in response to determining that the caregiver has not assisted the particular patient, is configured to send another communication to the caregiver.

11. The system of claim 1, wherein the patient monitoring device further comprises a camera, wherein, when the fall is confirmed, the patient monitoring device is configured to:
- activate the camera to capture images of the particular patient; and
- send the images to the device of the caregiver assigned to the particular patient.

12. The system of claim 1, wherein the patient monitoring device further comprises a camera, wherein the camera is be used to further confirm the fall, and wherein in response to determining, from the camera, that the particular patient has not fallen, report a false positive associated with a fall signature for storage in the database.

13. The system of claim 1, wherein, when activated, the radar sensor verifies that the fall signature does correlate to the fall by determining that the particular patient is on or near a floor surface.

14. A method comprising:
- detecting, through a microphone of a patient monitoring device in a patient room associated with a particular patient, sound data associated with the particular patient, wherein the patient monitoring device comprises:
  - patient monitoring device information that identifies the patient monitoring device and/or the patient room;
  - the microphone; and
  - a radar sensor for detecting one or more of physiological data and a movement of the particular patient;
- sending, by the patient monitoring device, the sound data with the patient monitoring device information that identifies the patient monitoring device and/or the patient room to a server;
- determining, by the server via a voice recognition algorithm, whether the sound data is an utterance;
- triggering, by the patient monitoring device, in response to receiving from the server a determining that the sound data is not an utterance and corresponds to a fall signature, the radar sensor to power on and verify that the fall signature does correlate to a fall of the particular patient;
- capturing, by the radar sensor, in response to verifying that the fall signature does correlate to the fall of the particular patient, the one or more physiological data of the particular patient;
- querying, by the patient monitoring device, a database to identify a caregiver and/or contact information of the caregiver assigned to the particular patient and/or the patient room based on the patient monitoring device information,
- notifying, by the patient monitoring device, a caregiver assigned to the particular patient via a device of the caregiver based on the contact information in response to:
  - determining that the sound data requires the caregiver to interact with the particular patient, and determining that the fall signature does correlate to the fall;
- sending, by the patient monitoring device, the one or more physiological data to the caregiver;
- detecting, by the patient monitoring device, that a badge associated with the caregiver assigned to the particular patient is in proximity to the particular patient; and
- triggering, in response to detecting the badge being proximate to the particular patient, the radar sensor to power on and detect whether the caregiver assigned to the particular patient has interacted with the particular patient after being notified.

15. The method of claim 14, further comprising transmitting RF waves, via the radar sensor, to detect the movement or the one or more physiological data of the particular patient.

16. The method of claim 14, further comprising detecting an RF tag carried by the caregiver in the patient room and generating a signal acknowledging that the caregiver visited the particular patient.

17. The method of claim 14, detecting, via the microphone, an utterance by the caregiver and generating a signal acknowledging that the caregiver visited the particular patient.

18. The method of claim 14, further comprising processing the sound data, by the server via the voice recognition algorithm, to determine at least one of:
- whether an emergency exists with respect to the particular patient;
- a type of request uttered by the particular patient;
- whether the sound is associated with a patient movement; and
- when the sound is not an utterance.

19. The method of claim 14, further comprising notifying, by the server, via at least one of: a wireless communication device of the caregiver; a display screen of a computer device located at a nurse station; a patient status display; and a patient monitoring device to trigger an audible alert over a speaker.

20. A patient monitoring device associated with a particular patient or a patient room, comprising:
- a microphone configured to detect sound data associated with the particular patient;
- a speaker;
- a radar sensor for detecting one or more of physiological data and a movement of the particular patient;
- a wireless interface; and
- a patient monitoring device identifier that identifies the patient monitoring device and/or the patient room;
- wherein upon detection of the sound data with the microphone, the patient monitoring device is configured to:
- send the sound data with the patient monitoring device identifier to a server;
- receive, from the server, a determination of whether the sound data is an utterance,
- trigger, in response to determining that the sound is not an utterance and corresponds to a fall signature, the radar sensor to activate and verify that the fall signature does correlate to a fall of the particular patient, capture, in response to verifying that the fall signature does correlate to the fall of the particular patient, the one or more physiological data of the particular patient, query a database to identify a caregiver and/or contact information of the caregiver assigned to the particular patient and/or the patient room based on the patient monitoring device identifier, and transmit, via the wireless interface and in response to determining that the fall signature does correlate to the fall, a signal to notify the caregiver assigned to the particular patient via a device of the caregiver, based on the contact information of the caregiver, to interact with the particular patient, transmit the one or more physiological data to the caregiver;

detect that a badge associated with the caregiver assigned to the particular patient is in proximity to the particular patient; and trigger, in response to detecting the badge being proximate to the particular patient, the radar sensor to power on and detect whether the caregiver assigned to the particular patient has interacted with the particular patient after being notified.

21. The patient monitoring device of claim 20, further comprising at least one of:
 a proximity sensor to detect if an individual is near the speaker;
 an infrared (IR) sensor to detect if an individual is near the speaker;
 an ambient light sensor to detect light quality relative to a position of the speaker;
 a radio frequency identifying device to enable real time location service (RTLS) asset tracking, staff tracking, and patient tracking;
 a temperature sensor; and
 a digital camera.

* * * * *